US009996611B2

(12) United States Patent
Kawanaka et al.

(10) Patent No.: US 9,996,611 B2
(45) Date of Patent: Jun. 12, 2018

(54) METHOD, COMPUTER PROGRAM, AND COMPUTER FOR CLASSIFYING USERS OF SOCIAL MEDIA

(71) Applicant: International Business Machines Corporation, Armonk, NY (US)

(72) Inventors: Risa Kawanaka, Tokyo (JP); Issei Yoshida, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 14/775,626

(22) PCT Filed: Mar. 5, 2014

(86) PCT No.: PCT/JP2014/055681
§ 371 (c)(1),
(2) Date: Sep. 11, 2015

(87) PCT Pub. No.: WO2014/141976
PCT Pub. Date: Sep. 18, 2014

(65) Prior Publication Data
US 2016/0063098 A1 Mar. 3, 2016

(30) Foreign Application Priority Data
Mar. 12, 2013 (JP) ................................. 2013-049346

(51) Int. Cl.
*G06F 17/30* (2006.01)
(52) U.S. Cl.
CPC .. *G06F 17/30705* (2013.01); *G06F 17/30702* (2013.01)
(58) Field of Classification Search
CPC .............................................. G06F 17/30598
See application file for complete search history.

(56) References Cited

U.S. PATENT DOCUMENTS 6,356,879 B2   3/2002  Aggarwal et al.
7,680,768 B2   3/2010  Koike et al.
(Continued)

FOREIGN PATENT DOCUMENTS

JP   2000-148864 A   5/2000
JP   2001-265808 A   9/2001
(Continued)

OTHER PUBLICATIONS

Pennacchiotti et al., "Democrats, Republicans and Starbucks Afficionados: User Classification in Twitter," Proceedings of the 17th ACM SIGKDD International Conference on Knowledge Discovery and Data Mining (KDD 2011), Aug. 21-24, 2011, San Diego, California, USA, pp. 430-438, 2011.
(Continued)

*Primary Examiner* — Hung Q Pham
(74) *Attorney, Agent, or Firm* — Scully, Scott, Murphy & Presser, P.C.; Keivan Razavi

(57) ABSTRACT

A computer system and method to classify a plurality of users in a plurality of clusters in social media associating a text profile and text content with each user. The method comprises: generating a content feature vector for each of a portion of users on the basis of content associated with the portion of users; generating mapping the plurality of clusters, and the plurality of clusters and the portion of users, on the basis of the content feature vectors; generating a first profile feature vector for each of the plurality of clusters on the basis of the profiles associated with the portion of users mapped to each cluster; and classifying each of the other users excluding the portion of users in a plurality of clusters on the basis of the profiles associated with the other users and the first profile feature vectors.

19 Claims, 9 Drawing Sheets

(56) References Cited

U.S. PATENT DOCUMENTS

| | | |
|---|---|---|
| 9,088,811 B2 | 7/2015 | Takamura et al. |
| 2002/0078054 A1 | 6/2002 | Kudo et al. |
| 2014/0172855 A1* | 6/2014 | Arnoux ............ G06F 17/30598 707/737 |
| 2015/0112918 A1* | 4/2015 | Zheng .................... G06Q 30/02 706/48 |

FOREIGN PATENT DOCUMENTS

| | | |
|---|---|---|
| JP | 2002-245212 A | 8/2002 |
| JP | 2005-115791 A | 4/2005 |
| JP | 4179341 B2 | 9/2008 |
| JP | 4898938 B2 | 3/2012 |
| JP | 2012-168653 A | 9/2012 |
| JP | 2012-221286 A | 11/2012 |

OTHER PUBLICATIONS

Rao, et al., "Classifying Latent User Attributes in Twitter," Proceedings of the 2nd International Workshop on Search and Mining User-Generated Contents (SMUC 2010), Oct. 30, 2010, Toronto, Ontario, Canada, pp. 37-44, 2010.

Twitter, "GET statuses/user_timeline", [online], Feb. 12, 2013, [Search: Feb. 25, 2013].< Internet URL > https://dev.twitter.com/docs/api/1.1/get/statuses/user_timeline.

Puniyani, et al., "Social Links from Latent Topics in Microblogs", Proceedings of the NAACL HLT 2010 Workshop on Computational Linguistics in a World of Social Media (WSA '10), Association for Computational Linguistics 2010, Jun. 6, 2010, Stroudsburg, Pennsylvania, USA, pp. 19-20.

Examination Report dated Aug. 23, 2017, received from the United Kingdom Intellectual Property Office, Application No. GB1516917.0.

* cited by examiner

METHOD, COMPUTER PROGRAM, AND COMPUTER FOR CLASSIFYING USERS OF SOCIAL MEDIA

TECHNICAL FIELD

The present invention relates to an information processing technique and, more specifically, to a technique for more efficiently identifying user sets in social media.

BACKGROUND ART

As social media has become used more extensively, classification of users of social media by "preferences and interests" for use in marketing has become more widely known. For example, these classifications are used to identify products and services the user is likely to purchase, and segmentation of large-scale user sets (classification according to similar interests). There have been attempts to identify sets on the assumption that users of a similar age and political orientation post similar content on social media. For example, efforts have been made to estimate the age and political orientation of users using content similarity (Non-patent Literature 1 and Non-patent Literature 2), and these efforts have had some success. Estimating sets of users sharing common preferences and interests using a similar technique is believed to be theoretically possible.

CITATION LIST

Patent Literature

Patent Literature 1 U.S. Pat. No. 4,898,938
Patent Literature 2 Laid-open Patent Publication No. 2000-148864

Non-Patent Literature

Non-Patent Literature 1
Pennacchiotti, M. and Popescu, A.-M., "Democrats, Republicans and Starbucks Aficionados: User Classification in Twitter," Proceedings of the 17th ACM SIGKDD International Conference on Knowledge Discovery and Data Mining (KDD 2011), pp. 430-438, 2011.
Non-Patent Literature 2
Rao, D., Yarowsky, D., Shreevats, A., and Gupta, M., "Classifying Latent User Attributes in Twitter," Proceedings of the 2nd International Workshop on Search and Mining User-Generated Contents (SMUC 2010), pp. 37-44, 2010.
Non-Patent Literature 3
Twitter, "GET statuses/user_timeline", [online], 2013-02-12, [Search: 2013-02-25].
<Internet URL>
https://dev.twitter.com/docs/api/1.1/get/statuses/user_timeline
Non-Patent Literature 4
Kriti Puniyani, Jacob Eisenstein, Shay Cohen, and Eric P. Xing, "Social Links from Latent Topics in Microblogs", Proceedings of the NAACL HLT 2010 Workshop on Computational Linguistics in a World of Social Media (WSA '10), Association for Computational Linguistics, Stroudsburg, Pa., USA, pp. 19-20, 2010.

SUMMARY OF INVENTION

Technical Problems

The prior art technique requires a large amount of content, but there are limits on the number of API query transmissions that can be performed given the widespread use of social media, and it requires a substantial amount of time to obtain a sufficient number of cases to determine similarities among a large number (for example, millions) of users (see Non-patent Literature 3).

In view of this problem, it is an object of the present invention to estimate the similarity of content without obtaining a large amount of content to classify users of social media.

The present invention was created by the present inventors on the basis of insights gained into the characteristics of social media while studying these issues. Users of social media are associated by profile in addition to the content that they post. A profile is a short amount of text including a self-introduction, and a tendency of the profile to include information related to content (preferences and interests, age, occupation, etc.) had been observed. Furthermore, because there are fewer profiles per user compared to content (usually one per user), the profiles of many users can be obtained within the limits imposed on sending and receiving queries. However, because the amount of text in the profile section is usually limited, and the profile section often includes expressions not directly related to topics posted as content, it is difficult to classify users reflecting the similarity of their content from the profile information alone.

Solution to Problems

The present invention uses these insights to provide means enabling classification on the basis of similarity of content without obtaining the content of all users. In other words, content is obtained only from a very small number of users to classify these users first. Then, the profile alone is used to assign a large number of additional users to the previously classified sets. In this way, classification reflecting a similarity of content can be realized without obtaining a large amount of content from all users.

The present invention is a method using a computer to classify a plurality of users in a plurality of clusters in social media associating a text profile and text content with each user, the method including the steps of: generating a content feature vector for each of a portion of users on the basis of content associated with the portion of users; generating mapping the plurality of clusters, and the plurality of clusters and the portion of users, on the basis of the content feature vectors; generating a first profile feature vector for each of the plurality of clusters on the basis of the profiles associated with the portion of users mapped to each cluster; and classifying each of the other users excluding the portion of users in a plurality of clusters on the basis of the profiles associated with the other users and the first profile feature vectors.

Here, the social media can be microblogging, and the content of a plurality of postings posted to microblogs by each user. Also, the content feature vector can use, as an element, a word included in a plurality of postings. A word can be a noun, verb or dependent expression included in postings. The content feature vector can also assign a degree of importance (score), such as the frequency of appearance, to each word included in a plurality of postings. The score is used during clustering to compare feature vectors.

Also, in the step of generating a plurality of clusters, the plurality of clusters can be generated by applying a latent Dirichlet allocation to the content associated with the portion of users, and by clustering words likely to be used on the same topic. Also, in the step of mapping the plurality of clusters and the portion of users, the portion of users are mapped to each cluster using the clustering results in the content associated with the portion of users.

Also, in the step of generating the first profile feature vectors, the first profile feature vectors can be generated on the basis of words in the profiles associated with the portion of users mapped to each cluster. A word can be a noun, verb or dependent expression included in postings. Here, the first profile feature vectors can be generated on the basis of whether or not the words are likely to appear compared to the words in the profiles associated with the portion of users mapped to other clusters. Also, the words can be the T-most likely words to appear (where T is a natural number) compared to the words in the profiles associated with the portion of users mapped to other clusters. Also, in the step of classifying each of the other users into the plurality of categories, each of the other users is classified into the plurality of categories on the basis of whether or not any of the T-most words are present in the profiles associated with the other users.

The method can also include a step of generating a second profile feature vector for each of the other users on the basis of the profiles associated with the other users excluding the portion of users. Here, in the step of classifying each of the other users into the plurality of categories, each of the other users can be classified into the plurality of categories on the basis of the first profile feature vectors and the second profile feature vectors.

Also, one user can be classified into a cluster corresponding to the first profile feature vector having the highest degree of similarity on the basis of the degree of similarity between the first profile feature vectors and the second profile feature vectors. Also, in the step of classifying each of the other users into the plurality of clusters, classification of one user in a plurality of clusters can be permitted.

Also, in the step of classifying each of the other users into the plurality of clusters, content associated with the other users does not have to be used. Also, the number of users in the portion of users can be smaller than the number of other users, and the amount of information in the profiles can be less than the amount of information in the content.

The method can also include the step of connecting a server hosting the social media to a computer classifying the plurality of users in a plurality of clusters via a network. Here, the computer can receive information sent by the server in response to a request from the computer. The amount of information available can be restricted on a per-unit-of-time basis.

The method can also include the step of storing the content and profiles associated with the portion of users and the profiles associated with the other users in a storage means of the computer by repeating the step in which the computer receives information sent by the hosting computer.

When the present invention is understood as a computer program or computer system, it should be obvious that technical features can be provided which are substantially the same as those of the present invention when understood as the method described above.

Effect of the Invention

The present invention is able to classify users of social media without obtaining a large amount of content reflecting the similarity of their content.

DESCRIPTION OF EMBODIMENT

Embodiment

The following is an explanation of preferred embodiments of the present invention with reference to the drawings. However, these embodiments do not limit the present invention with respect to the scope of the claims. Also, all combinations of characteristics explained in the embodiments are not necessarily essential to the technical solution of the present invention. In addition, it should be understood that many other embodiments of the present invention are possible and that there is no intention to limit the scope of the present invention to what is described herein. It should also be noted that not all combinations of characteristics explained in the embodiments are essential to the technical solution of the present invention. Identical elements are denoted by the same reference symbols in the explanation of all of the embodiments (unless otherwise indicated).

Figure 1:
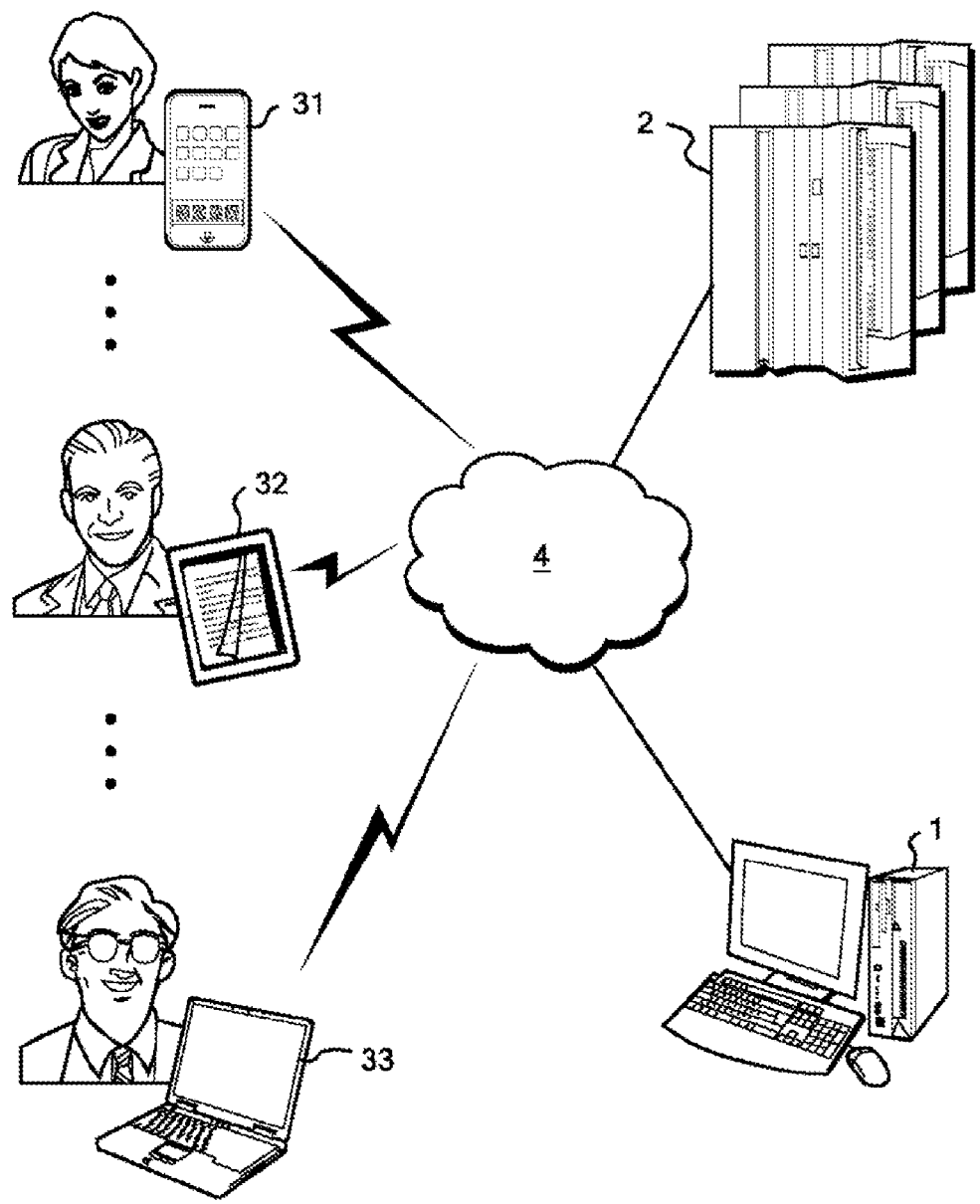
FIG. 1 is a schematic diagram used to explain the microblogging system.

FIG. 1 is a schematic diagram used to explain the microblogging system, which is one example of social media. In this system, a microblogging server (server hosting the social media) 2 is connected via the internet 4 to user terminals so the server and user terminals are able to communicate with each other. The user terminals can be any type of computer equipped with a communication function. In addition to the smartphone 31, tablet 32 and (notebook-type) personal computer 33 shown in the drawing, examples include a personal data assistant (PDA, portable information terminal), onboard computer, and netbook not shown in the drawing.

Figure 2:
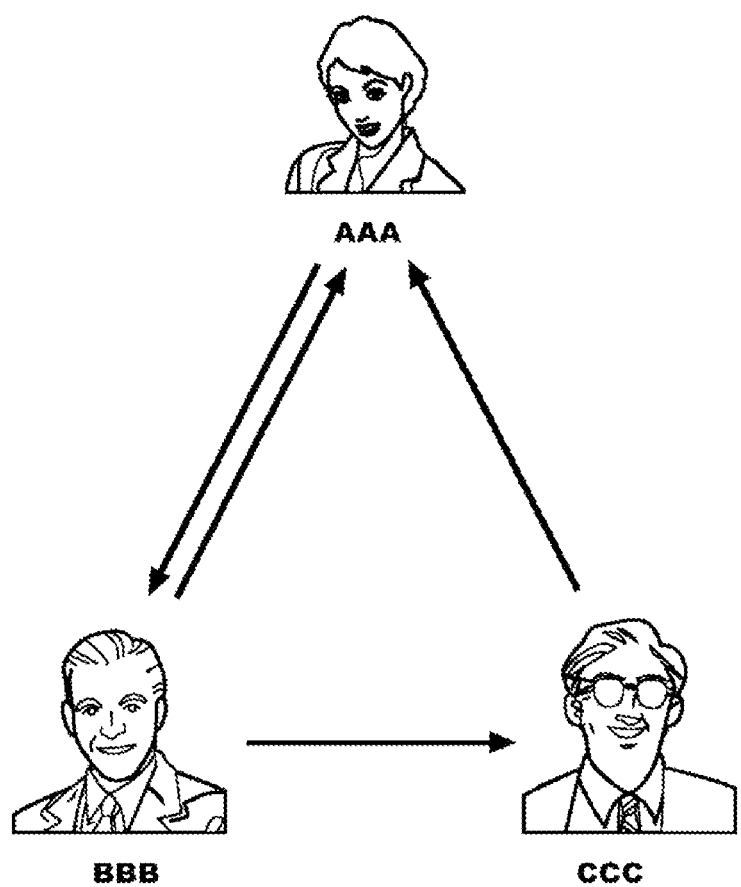
FIG. 2 is a schematic diagram used to explain the follower-followed relationship in microblogging.

FIG. 2 is a schematic diagram used to explain the follower-followed relationship in microblogging. The user of a microblog can pre-register with friends, acquaintances and other users sharing similar interests and concerns, and automatically receive content (text content) posted by these users. Registering is called "following", and a following relationship can either be a reciprocal relationship in which users follow each other, or a one-way relationship in which one of the users follows the other user. For example, the arrows in FIG. 2 indicate that user AAA and user BBB follow each other, user BBB follows user CCC, and user CCC follows user AAA.

Figure 3:
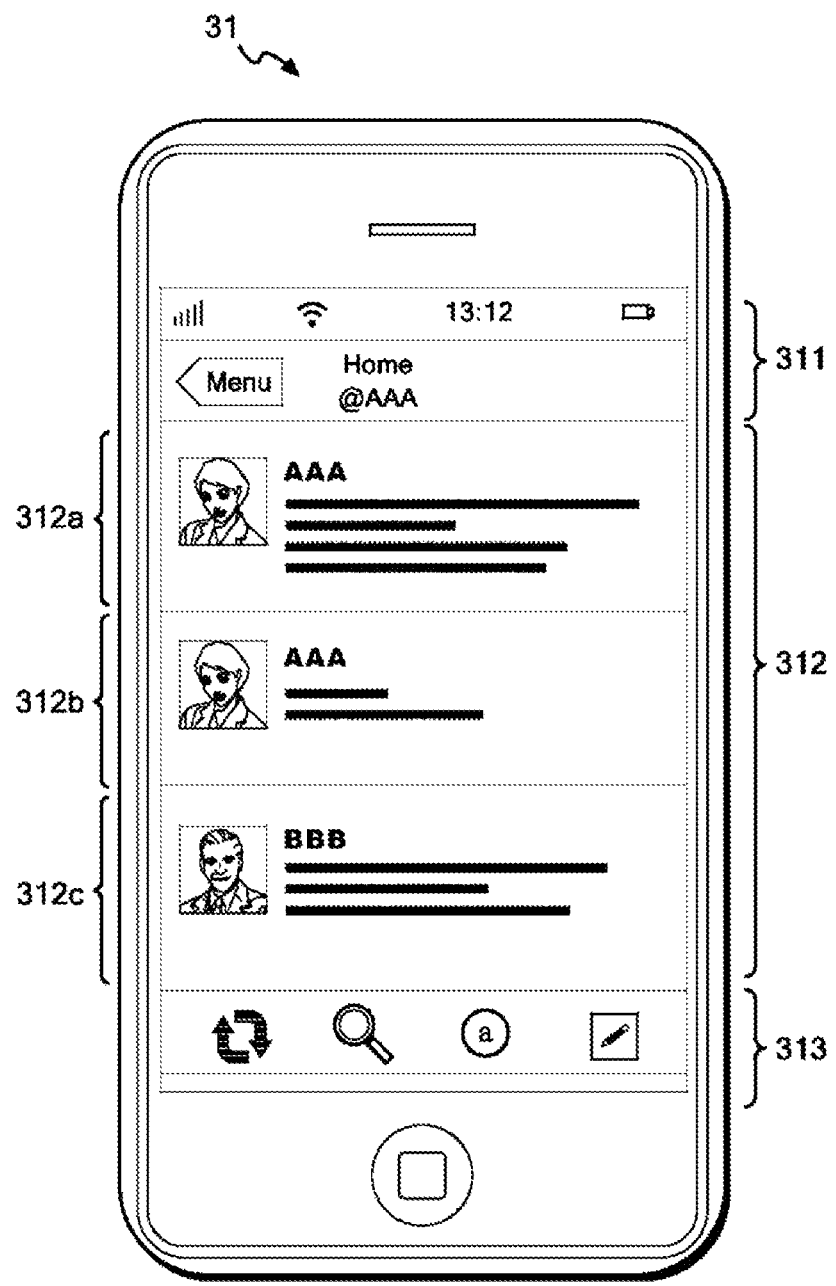
FIG. 3 is a diagram used to explain a smartphone serving as a user terminal and a screen displayed on the smartphone.

FIG. 3 is a diagram used to explain a smartphone 31 serving as a user terminal and a screen displayed on the smartphone. A microblogging application screen is displayed on the touch screen of the smartphone 31, and the application screen is divided, from top to bottom, into a home section 311, a timeline section 312, and a control section 313. The home section includes a menu button and information indicating that the timeline of user AAA is being displayed in the timeline section 312. The timeline section 312 displays, from top to bottom, content section 312a and content section 312b from user AAA, and content section 312c from user BBB. These content sections 312a-c are displayed chronologically. In other words, the uppermost message section 312a corresponds to the most recent content.

Figure 4:
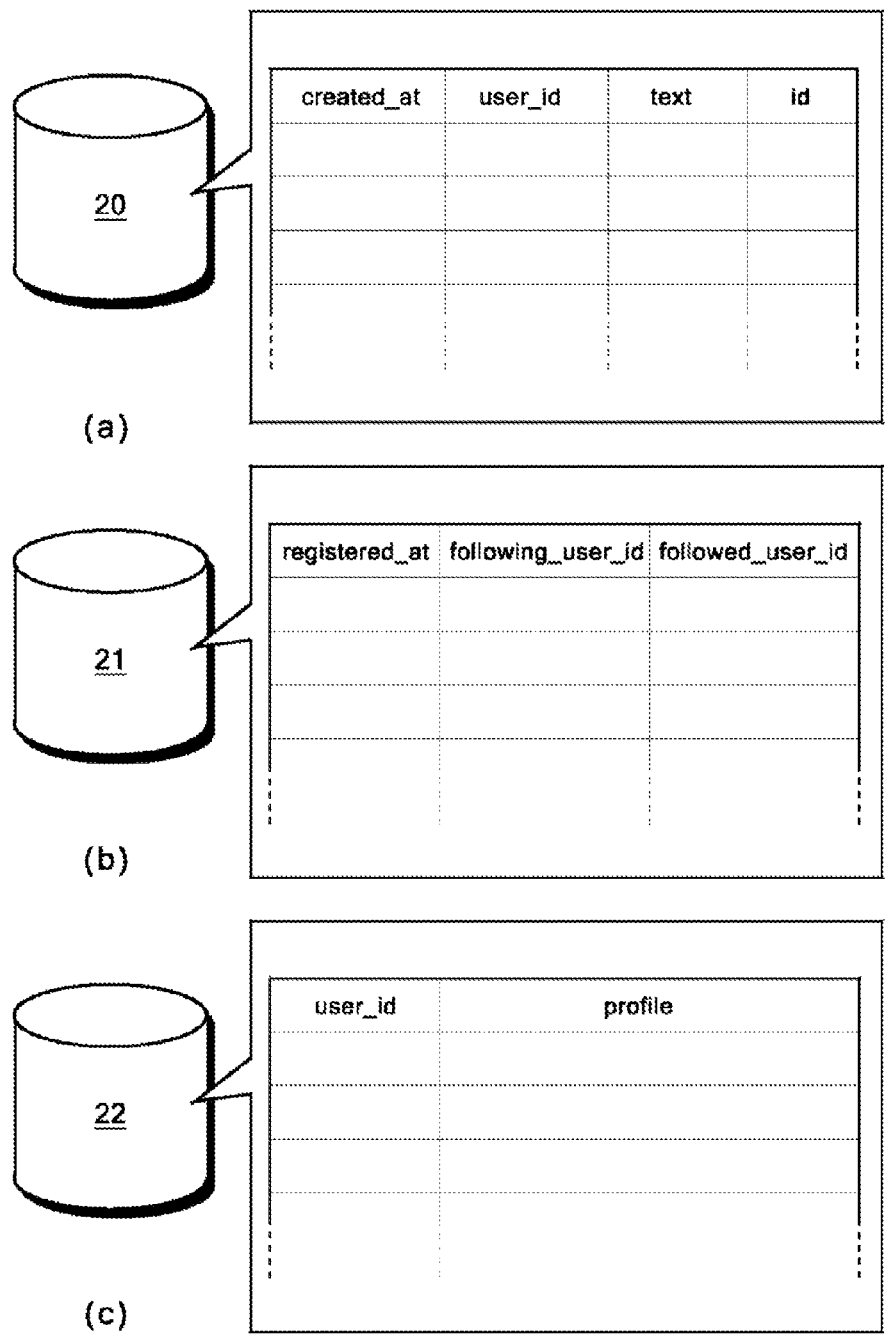
FIG. 4 is a diagram used to explain the structure of data stored in hard disk devices inside a microblogging server.

FIG. 4 is a diagram used to explain the structure of data stored in hard disk devices 20, 21 and 22 inside the microblogging server 2. The content table (FIG. 4(a)) stored in hard disk drive 20 includes an origination date-and-time field (created_at) indicating the date and time at which each content section was posted, a user ID field (user_id) indicating the user who posted the content, and a text (text) field containing the actual content. The character limit (for example, 140 characters) can be included in the text field. The user relationship table (FIG. 4(b)) stored in hard disk drive 21 includes a registration date-and-time field (registered_at) indicating the data and time at which a follower relationship was registered, a following user ID field (following_user_id) indicating the following user, and a followed user ID (followed_user_id) field indicating the user being followed. The profile table (FIG. 4(c)) stored in hard disk drive 22 includes a user ID (user_id) field indicating each user, a name field for each user (not shown), a location information field for each user (not shown), and a profile field (profile) for each user.

Figure 5:
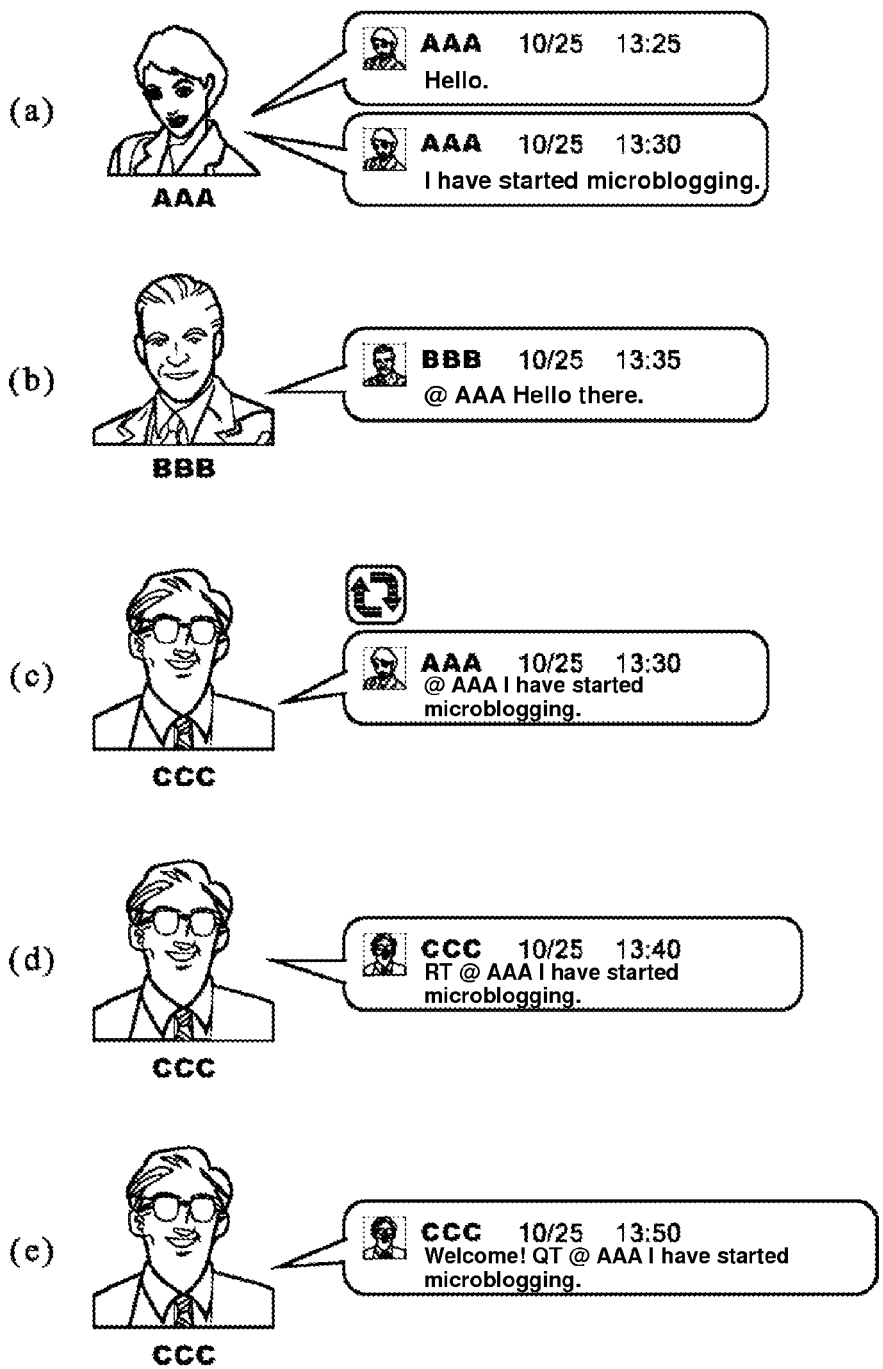
FIG. 5 is a diagram used to explain the types of posted content.

FIG. 5 is a diagram used to explain the types of posted content. FIG. 5(a) explains typical content. Here, user AAA posts content to her own timeline. This content is displayed in user AAA's timeline and in the timelines of the users following user AAA (user BBB and user CCC in the example shown in FIG. 2). FIG. 5(b) explains the reply content. Reply content is a response to specific content. This reply content is displayed in the timeline of the following user as well as the timeline of the user being replied to. Here, user BBB is replying to content from user AAA, posting the reply content ("Hello there.") This reply content is displayed in user BBB's own timeline as well as the timelines of users following user BBB (user AAA in the example in FIG. 2).

FIG. 5(c) and FIG. 5(d) explain reposted content. User CCC reposts as reposted content the original content from user AAA displayed in his own timeline ("I have started microblogging."). The reposted content is displayed in the timeline of users following user CCC (user BBB in the example in FIG. 2). In the first mode shown in FIG. 5(c), the reposted content is displayed in the timeline of users following user CCC with the name of the original user AAA. In the second mode shown in FIG. 5(d), it is displayed with the name of the reoperation user CCC. FIG. 5(e) explains quoted content. User CCC quotes the original content of user AAA displayed in his own timeline ("I have started microblogging.") and adds his own comment ("Welcome!") to the quoted content that is reposted. The quoted content is displayed in the timeline of users following user CCC.

Figure 6:
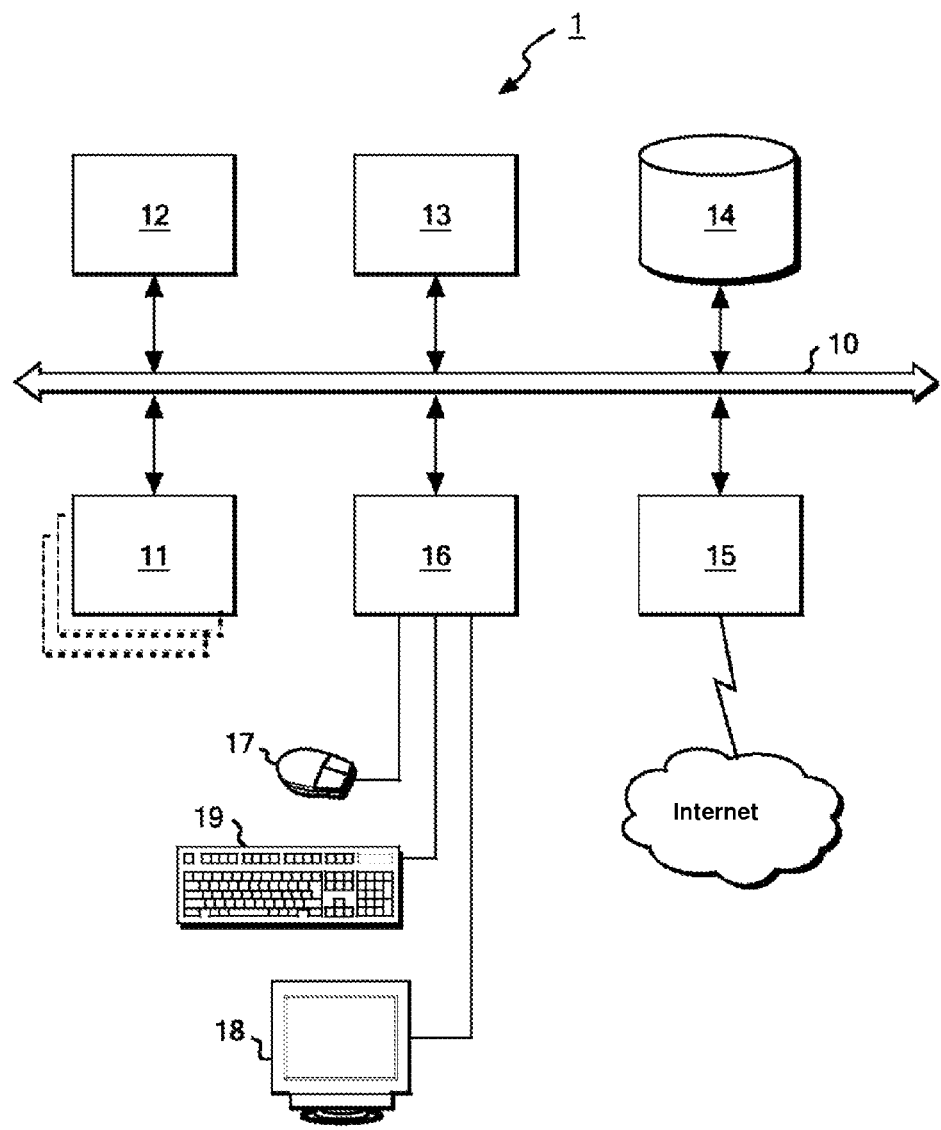
FIG. 6 is a block diagram used to explain the hardware configuration of a computer.

FIG. 6 is a block diagram used to explain the hardware configuration of a personal computer 1 (the computer classifying the plurality of clusters). The hardware configuration of the computer 1 includes a (high-speed and low-speed) bus 10, a CPU (arithmetic and control unit) 11 connected to the bus 10, RAM (random access memory: storage device) 12, ROM (read-only memory: storage device) 13, an HDD (hard disk drive: storage device) 14, a communication interface 15, and an input/output interface 16. It also includes a mouse 17 connected to the input/output interface 16, a flat panel display (display device) 18, and a keyboard 19. In this explanation, the computer 1 employs typical personal computer architecture. However, the CPU 11 and HDD 14 can be multiplexed to seek higher data processing performance and availability. In addition to a desktop system, any other type of computer system can be employed. The computer 1 is connected to the microblogging server 2 via the internet (network) 4 so that the computer and server can communicate with each other.

The software configuration of the computer 1 includes an operating system (OS) for providing basic functions, application software using the OS functions, and driver software for the input/output device. The software is loaded along with various types of data into the RAM 12 and executed by the CPU 11 so that the computer 1 as a whole can realize the functions shown in FIG. 7 and execute the processing shown in FIG. 8.

Figure 7:
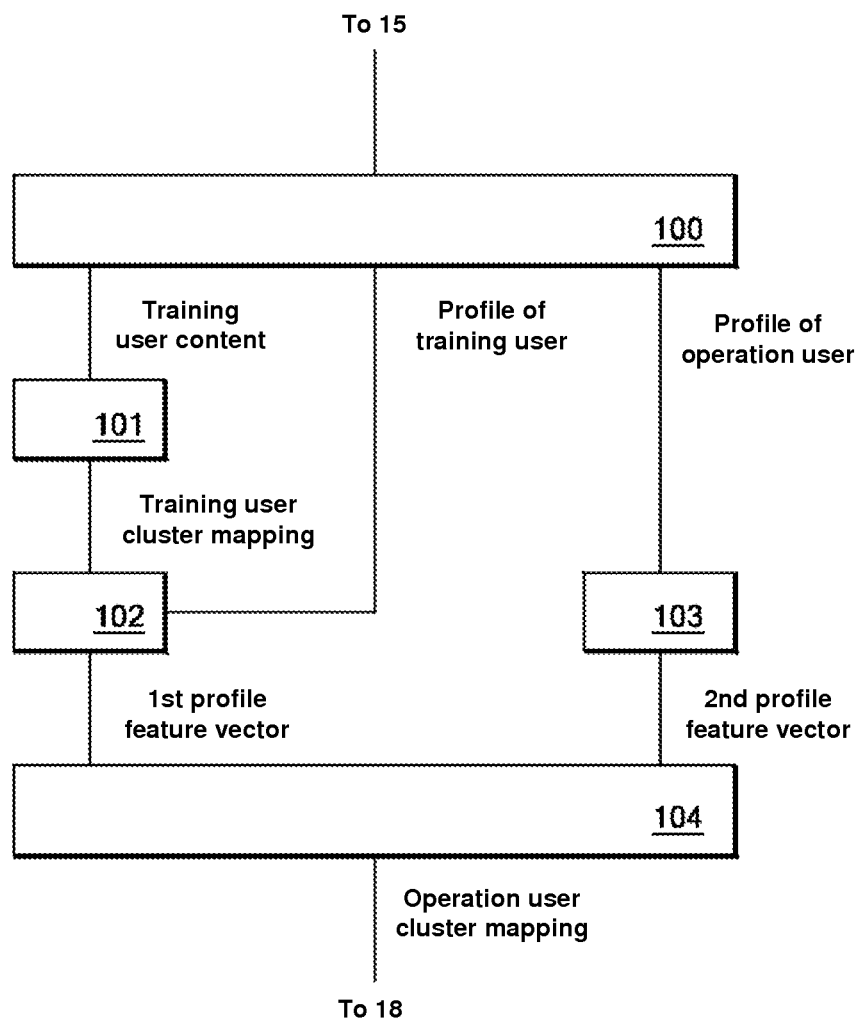
FIG. 7 is a block diagram used to explain the function module configuration of a computer.

FIG. 7 is a block diagram used to explain the function modules of the computer 1. The computer 1 includes a storage module 100, a training cluster mapping generating module 101, a first profile feature vector generating module 102, a second profile feature vector generating module 103, and a posting cluster mapping generating module 104.

The following is the input and output data of each module. The profiles and content of training users and the profiles of operation users are inputted from the communication interface 15 to the storage module 100. The content of training users is outputted from the storage module 100 to the training cluster mapping generating module 101, the profiles of training users are outputted to the first profile feature vector generating module 102, and the profiles of operation users are outputted to the second profile feature vector generating module 103. Content from the training users is inputted from the storage module 100 to the training cluster mapping generating module 101. Cluster mapping of the training users is outputted from the training cluster mapping generating module 101 to the first profile feature vector generating module 102. The cluster mapping of training users is inputted from the training cluster mapping generating module 101 and the profiles of the training users are inputted from the storage module 100 to the first profile feature vector generating module 102. The first profile feature vectors are outputted from the first profile feature vector generating module 102 to the operation cluster mapping generating module 104. The profiles of the operation users are inputted from the storage module 100 to the second profile feature vector generating module 103. The second profile feature vectors are outputted to the operation cluster mapping generating module 104 from the second profile feature vector generating module 103. The first profile feature vectors from the first profile feature vector generating module 102 and the second profile feature vectors from the second profile feature vector generating module 103 are inputted to the operation cluster mapping generating module 104. The cluster mapping of operation users is outputted to the display 18 from the operation cluster mapping generating module 104.

EXAMPLE

Figure 8:
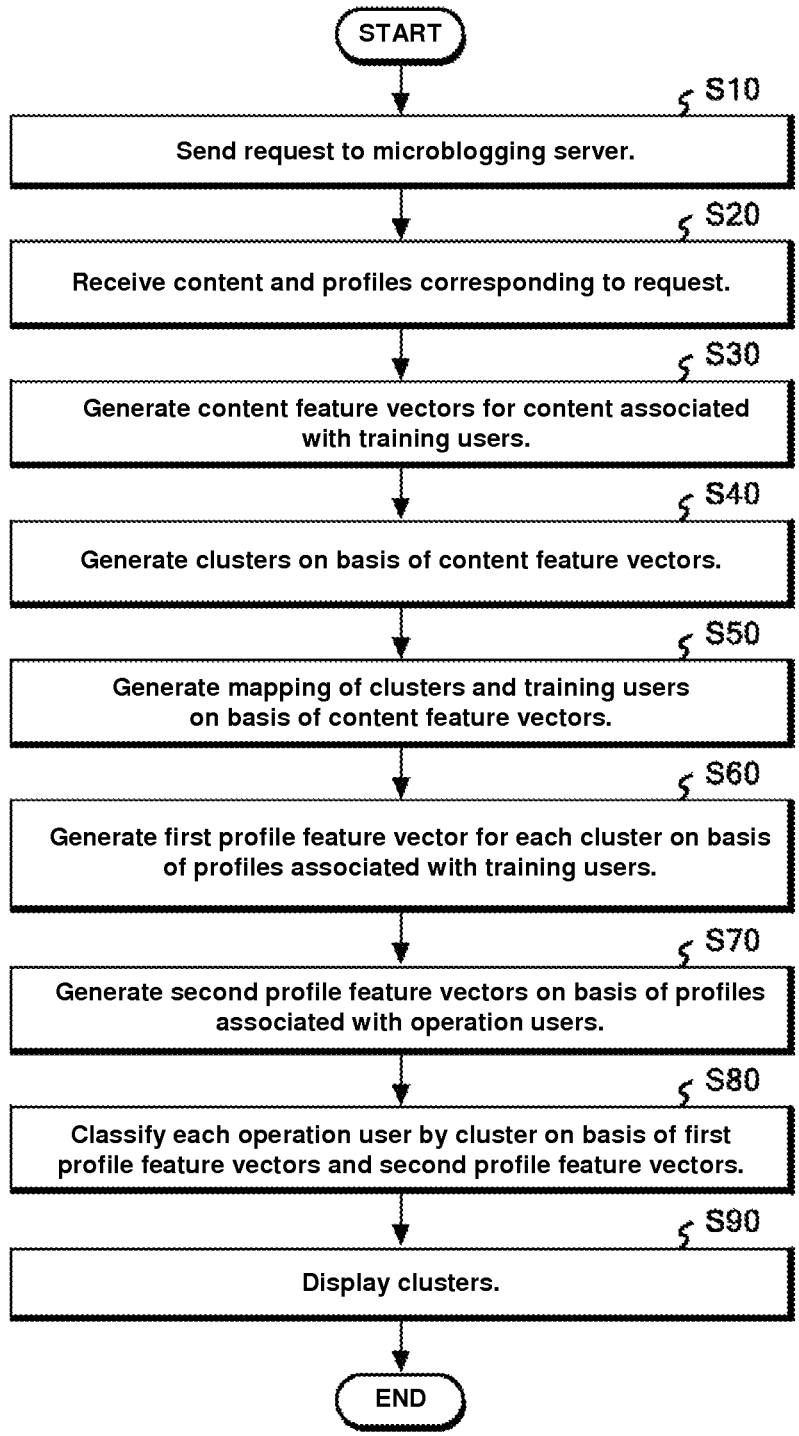
FIG. 8 is a flowchart used to explain a process executed by a computer.
Figure 9:
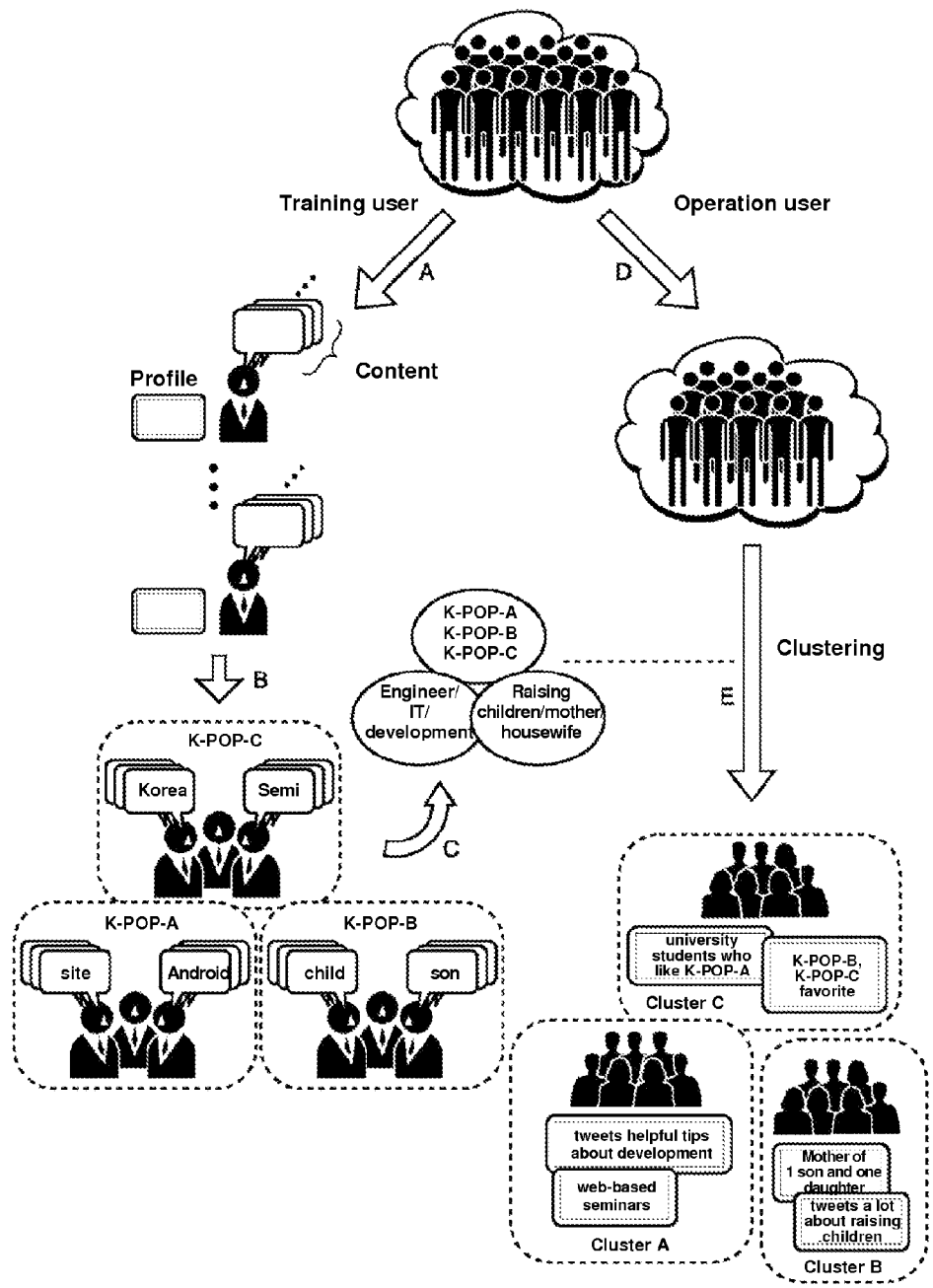
FIG. 9 is a diagram used to explain the clustering process.

FIG. 8 is a flowchart used to explain the processing executed by the computer 1. FIG. 9 is a diagram used to explain the clustering process executed by the computer 1. The following explanation follows the flowchart shown in FIG. 8 with reference to FIG. 9.

First, a request for data is sent from the computer 1 to the microblogging server 2 (S10). Next, the data corresponding to the request is received from the server (S20). Here, the request sent from the server 2 to the computer 1 includes content associated with training users (some of the users) (see FIG. 4(a)), and profiles associated with training users and operation users (other users) (see FIG. 4(c)). Usually, there are limits on the number of API requests for obtaining data from a microblogging server 2 and on the amount of data that can be obtained per request. Therefore, S10 and S20 are repeated until the necessary data has been obtained. The obtained data is stored in the storage module 100.

The number of training users (arrow A) is much smaller than the number of operation users (arrow D). For example, ten thousand microblog users can be targeted as training users, and a million microblog users can be targeted as operation users. Also, the amount of profile information is much smaller than the amount of content. A single profile is usually associated with each user, while the number of content sections (messages, posts, etc.) associated with a user can be in the thousands. For example, the most recent one thousand posts from a single user can be targeted as content associated with the user.

Next, a content feature vector is generated on the basis of content associated with the training user (S30). More specifically, the training cluster mapping generating module 101 extracts a noun from the content (plural) associated with a training user, and generates a feature vector using the number of appearances by this word as an element (the number of content sections in which the word appears). Any natural language processing technique can be used to extract the noun. The number of appearances by the noun can be viewed as an indicator of the degree of importance of the noun. Noun candidates with a high degree of importance can be prepared beforehand. Instead of nouns or along with nouns, expressions other than nouns, such as verbs and dependent expressions, can be extracted using the natural language processing technique.

Next, mapping of a plurality of clusters and a plurality of clusters and training users is generated on the basis of the content feature vector (S40, S50). More specifically, the training cluster mapping generating module 101 plugs sets of pairs (training users, content feature vectors corresponding to the training users) into a clustering algorithm, and obtains mapping of the clusters and clusters for each training user. Here, the clustering algorithm can be any algorithm used to determine the degree of similarity between training users using the degree of similarity between content feature vectors. For example, the following can be used when a noun is used as the word. First, latent Dirichlet allocation (LDA) is applied to all of the content associated with all of the training users, and the nouns likely to be used in the same topic are clustered. As a result, groups of nouns likely to be used in IT-related topics (site, Android, etc.), groups of nouns likely to be used in child-raising topics (child, son, etc.), and groups of nouns likely to be used in Korean pop music-related topics (Korea, Semi) are entered into the same clusters. Next, the results of clustering nouns in content are used to classify training users into each cluster (for example, Clusters A-C) according to Equation (1) (arrow B).

Equation 1

$$c_u := \underset{c \in C}{\operatorname{argmax}} \frac{N_{cu} + \alpha}{N_u + K\alpha} \quad (1)$$

Provided,
$c_u$: clusters to which user u belongs
C: all clusters
K: total number of clusters
$N_{cu}$: number of nouns belonging to cluster c in the content of user u
$N_u$: total number of nouns in the content of user u
$\alpha$: smoothing coefficient Next, a first profile feature vector is generated for each cluster on the basis of the profiles associated with training users (S60). In other words, the feature vector for a cluster is switched from content to the profile. The generation of a first profile feature vector corresponds to the integration of expressions in the profiles of the training users in each cluster. More specifically, the first profile feature vector generating module 102 generates a first profile feature vector for each cluster which characterizes the cluster using nouns (profile expressions) appearing in the profiles of training users clustered in each cluster. For example, a tficf score is obtained on the basis of nouns (profile expressions) appearing in the profile section of the training users in each cluster. Here, the tficf score is an indicator which is compared to other clusters to obtain the expressions likely to appear in the profiles of training users in a cluster, and is calculated using Equation (2). The T-most common expressions in the tTficf score are typical profile expressions in the cluster, and these typical profile expressions are used as an element to generate first profile feature vectors. In this example, "engineer", "IT" and "development" are typical profile expressions corresponding to Cluster A.

$$tficf(w, c) := M_{wc} \times \log \frac{K}{1 + |\{c \in C | w \in b_u, \exists u \in U_c\}|} \quad (2)$$

Provided,
w: profile expression
$M_{wc}$: number of classified users in cluster c including w in profile
$U_c$: number of classified users in cluster c Next, second profile feature vectors are generated on the basis of profiles associated with operation users (S70). More specifically, the second profile feature vector generating module 103 extracts a nouns from (a single) profile associated with a single operation user, and generates a feature vector using the number of appearances as an element. Any natural language processing technique can be used to extract the noun. Instead of nouns or along with nouns, expressions other than nouns, such as verbs and dependent expressions, can be extracted using the natural language processing technique.

Next, each operation user is classified in a plurality of clusters on the basis of first profile feature vectors and second profile feature vectors (S80). In other words, the operation cluster mapping generating module 104 compares the second profile feature vector corresponding to a single operation user to each first profile feature vector, and classifies the operation user in the clusters corresponding to the most similar feature vectors. In this way, operation users can be classified in the appropriate clusters on the basis of the text in at most a single profile section without requiring the acquisition and analysis of content associated with the user. For example, in the present example, the typical profile expressions corresponding to Cluster A are "engineer", "IT" and "development", so operation users describing themselves in the profile section using expressions close to these (such as "tweets helpful tips about development" and "web-based seminars") are classified in Cluster A. Whether or not a given expression is close to another expression can be determined using existing language processing techniques as mentioned in the modified examples below.

Modified Example 1

Operation users including in their profiles any of the T-most typical profile expressions from a cluster in their tficf score can be classified in the cluster. Here, a single operation user can be classified in a plurality of clusters.

Modified Example 2

Any classifier that receives first profile feature vectors and outputs clusters can be prepared, and the classifier can be learned in Step S60. Here, second profile feature vectors can be inputted to the classifier, and the outputted clusters can be the classification results.

In all cases (the example, modified example 1 or modified example 2), the resulting clusters of operation users can be outputted to a display 18 (S80).

The present invention can be embodied using hardware only, software only, or a combination of both hardware and software elements. The present invention is not limited to the preferred embodiment described above. It can be implemented in software, including firmware, resident software, microcode, and parsed pico-code.

The present invention can also take the form of a computer program in programming code used by or associated with a computer or any other instruction executing system, as well as computer readable media. For the purposes of the present explanation, the computer-readable media can be any device able to contain, store, communicate, transmit or propagate a program used by or associated with any instruction executing system or device. More specifically, the parsing control module described above means an instruction executing system or a "computer".

The medium can be an electronic, magnetic, optical, electromagnetic, infrared or semiconductor system (or device) or a propagation medium. Examples of computer-readable media include semiconductor or solid-state memory, magnetic tape, removable computer diskettes, random access memory (RAM), read-only memory (ROM), rigid magnetic disks, and optical disks. At present, optical disks include compact disk read-only (CD-ROM) disks, compact disk read/write (CD-R/W) disks, and DVDs.

Data processing systems for storage and/or execution of programming code include at least one processor connected directly or indirectly to a memory element via a system bus. Memory elements include local memory used during the actual execution of programming code, bulk storage devices, and cache memory provided to temporarily store at least some programming code in order to decrease the number of times programming code has to be read from a bulk storage device during execution.

Input/output (I/O) devices (including, but not limited, to a keyboard, mouse and pointing device) can be connected directly or indirectly via an intermediary I/O controller to the system.

Also, a network adapter can be connected to the system, and the data processing system can be linked to another data processing system, remote printer, or storage device via an intermediary private or public network. A modem, cable modem or Ethernet® card represent a small number of network adapters that are currently available.

REFERENCE SIGNS LIST

1: Personal computer
11: CPU (arithmetic and control unit)
12: RAM (random access memory: storage device)
13: ROM (read-only memory: storage device)
14: HDD (hard disk drive: storage device)
15: Communication interface
16: Input/output interface
17: Mouse
18: Flat panel display (display device)
2: Microblogging server
20, 21: Hard disk devices
31: Smartphone
32: Tablet
33: (Notebook-type) personal computer
100: Storage module
101: Training cluster mapping generating module
102: First profile feature vector generating module
103: Second profile feature vector generating module
104: Operation cluster mapping generating module

The invention claimed is:

1. A method using a computer having a hardware processor to classify a plurality of users in social media, the method comprising the steps of:
generating, using the hardware processor, a content feature vector for each of a portion of users of the plurality of users on the basis of content associated with the portion of users;
generating, using the hardware processor, a plurality of clusters on the basis of the content feature vectors;
mapping, using the hardware processor the portion of users to the plurality of clusters on the basis of the content feature vectors;
generating, using the hardware processor, a first profile feature vector for each of the plurality of clusters on the basis of profiles associated with corresponding users within the portion of users mapped to each cluster; and
classifying, using the hardware processor, each of the other users excluding the portion of users into the plurality of clusters on the basis of profiles associated with the other users and the first profile feature vectors, and
outputting, via display device associated with said computer, clusters corresponding to the classified other users.

2. The method according to claim 1, wherein the social media is microblogging, and the content is a plurality of postings posted to microblogs by the portion of users.

3. The method according to claim 2, wherein the content feature vector uses, as an element, a word in the plurality of postings as an element.

4. The method according to claim 3, wherein the content feature vector also uses, as an element, frequency of appearance or degree of importance of a word in the plurality of postings.

5. The method according to claim 1, further comprising: mapping, using the hardware processor, a latent Dirichlet allocation to the content associated with the portion of users, and clustering words likely to be used on the same topic.

6. The method according to claim 5, further comprising: mapping, using the hardware processor, the portion of users to each cluster using clustering results in the content associated with the portion of users.

7. The method according to claim 1, wherein the first profile feature vectors are generated on the basis of words in the profiles associated with the portion of users.

8. The method according to claim 7, wherein the basis of words is based on whether or not the words are likely to appear compared to the words in the profiles associated with the portion of users.

9. The method according to claim 7, wherein the words are any of the T-most likely words to appear (where T is a natural number) compared to the words in the profiles associated with the portion of users.

10. The method according to claim 9, wherein the basis of words is based on whether or not any of the T-most likely words are present in the profiles associated with the other users.

11. The method according to claim 1 further comprising: generating, using the hardware processor, a second profile feature vector for each of the other users on the basis of the profiles associated with the other users excluding the portion of users; and
wherein each of the other users is classified on the basis of the first profile feature vectors and the second profile feature vectors.

12. The method according to claim 11, wherein the basis of the basis of the first profile feature vectors and the second profile feature vectors is a degree of similarity between the first profile feature vectors and the second profile feature vectors.

13. The method according to claim 1, each of the other users is classified into the plurality of clusters without using content associated with the other users.

14. The method according to claim 1, wherein the number of the portion of users is smaller than the number of other users, and the amount of information in a profile is less than the amount of information in the content.

15. The method according to claim 1 further comprising the step of connecting a server hosting the social media to a computer classifying the plurality of users in a plurality of clusters via a network, the computer receiving information sent by the server in response to a request from the computer.

16. The method according to claim 15, wherein the amount of information is restricted on a per-unit-of-time basis.

17. The method according to claim 16 further comprising the step of storing the content and profiles associated with the portion of users and the profiles associated with the other users in a storage means of the computer by repeating receiving of information sent by the server.

18. A computer program product embodying a program of instructions on a tangible computer readable device when executed by the computer, the instructions configure the computer to perform a method to classify a plurality of users in social media, the method comprising:
   generating a content feature vector for each of a portion of users of the plurality of users on the basis of content associated with the portion of users;
   generating a plurality of clusters on the basis of the content feature vectors;
   mapping the portion of users to the plurality of clusters on the basis of the content feature vectors;
   generating a first profile feature vector for each of the plurality of clusters on the basis of profiles associated with corresponding users within the portion of users mapped to each cluster; and
   classifying each of other users excluding the portion of users into the plurality of clusters on the basis of profiles associated with the other users and the first profile feature vectors, and
   outputting, via display device associated with said computer, clusters corresponding to the classified other users.

19. A computer system for classifying a plurality of users in social media, the computer system comprising:
   a memory storage device;
   a processor device coupled with the memory storage device and configured to:
   generate a content feature vector for each of a portion of users of the plurality of users on the basis of content associated with the portion of users;
   generate a plurality of clusters on the basis of the content feature vectors;
   map the portion of users to the plurality of clusters and on the basis of the content feature vectors;
   generate a first profile feature vector for each of the plurality of clusters on the basis of profiles associated with corresponding users within the portion of users mapped to each cluster; and
   classify each of the other users excluding the portion of users into the plurality of clusters on the basis of profiles associated with the other users and the first profile feature vectors, and
   outputting, via display device associated with said computer, clusters corresponding to the classified other users.

* * * * *